United States Patent [19]

McLean

[11] Patent Number: 5,157,723

[45] Date of Patent: Oct. 20, 1992

[54] MOUNTS FOR ARTICLES

[75] Inventor: Kenneth W. McLean, London, Canada

[73] Assignee: Northern Telecom Limited, Montreal, Canada

[21] Appl. No.: 658,624

[22] Filed: Feb. 21, 1991

[51] Int. Cl.$^5$ .............................................. H04M 1/00
[52] U.S. Cl. ..................................... 379/429; 379/440
[58] Field of Search ................ 248/639; 379/368, 411, 379/419, 428, 441, 454, 433, 440, 429; 364/480, 481

[56] References Cited

U.S. PATENT DOCUMENTS

| | | | |
|---|---|---|---|
| 4,581,495 | 4/1986 | Geri et al. | 379/419 |
| 4,782,522 | 11/1988 | Kramer et al. | 379/368 |
| 4,830,328 | 5/1989 | Takach, Jr. et al. | 248/639 |
| 4,839,921 | 6/1989 | Awakowicz et al. | 379/428 |
| 5,081,674 | 1/1992 | Wijas et al. | 379/433 |
| 5,086,466 | 2/1992 | Gumb et al. | 379/440 |

FOREIGN PATENT DOCUMENTS 0054657 2/1990 Japan .................................. 379/411

OTHER PUBLICATIONS

Motorola, "Dyna-Tac Cellular Mobile Telephone", Mechanical Parts, Aug. 31, 1983.
IBM Corporation, "Speaker Bracket", IBM Technical Disclosure Bulletin, vol. #33, #7, Dec. 1990.

Primary Examiner—Curtis Kuntz
Assistant Examiner—William Cumming
Attorney, Agent, or Firm—R. J. Austin

[57] ABSTRACT

A mount for connecting together two articles, the mount comprising a wall and two sets of latches projecting from the wall. The mount is particularly useful for connecting a visual readout display unit to a aprinted circuit board in a telephone where minimum height requirements are paramount. The latches are provided in two sets, one set for registration with each article and a latch of each set is disposed, along the wall, between latches of the other set.

4 Claims, 2 Drawing Sheets

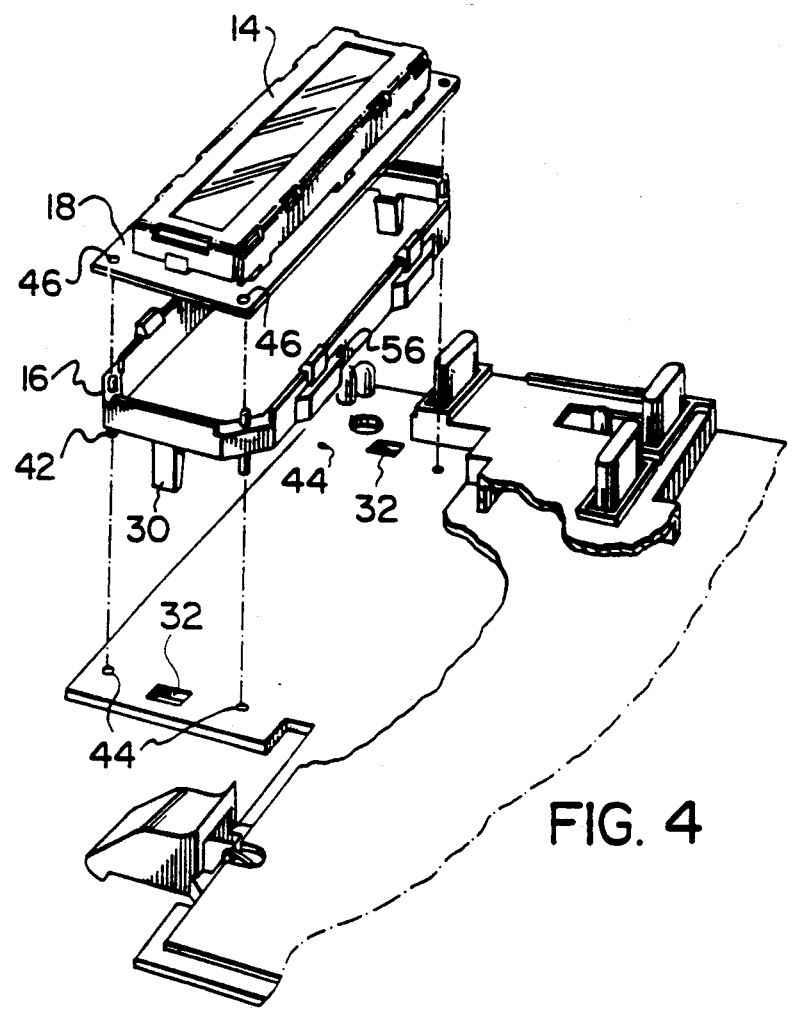
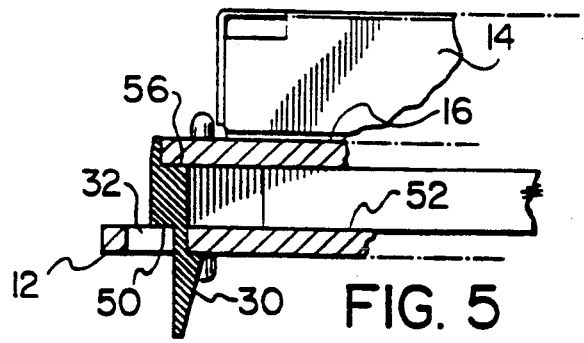
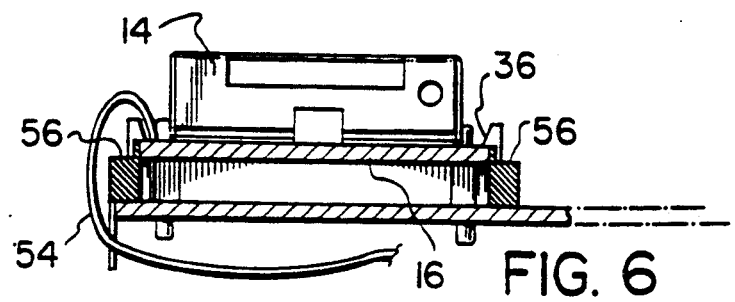

MOUNTS FOR ARTICLES

BACKGROUND OF THE INVENTION

1. Field of the Invention

This invention relates to mounts for connecting two articles together.

2. Related Art

In telephone design, it is now usual to provide a visual readout display unit giving the user certain desirable information. These units are normally provided in bases of telephones so as to face upwardly and, for this purpose, are conveniently mounted upon printed circuit boards housed within the telephone bases. Modern telephone base designs are now more shallow from top to bottom than previous designs and such shallowness has created problems in providing adequate space between a printed circuit board and the top of a telephone base for location of a visual readout display unit. Certainly, if snap fittings of general engineering design are to be used for mounting of a unit on a printed circuit board, such fittings, because of the length required to give them a cantilever flexibility, would result in a deeper telephone base than is desirable. As a result, to operate within the confines of modern shallow base design, it has been found necessary to provide location pins upon a display unit and to heat stake the pins into location holes in a printed circuit board to hold a unit in position. A problem with this type of approach is that the heat staking operation is an additional manufacturing operation which it would be desirable to avoid. In addition, heat staking of the location pins renders it extremely difficult to dismantle a display unit from a printed circuit board without causing damage.

SUMMARY OF THE INVENTION

The present invention seeks to provide a mount for assembling two articles together and which may be designed to have minimal height so that the total height beyond that of the combined articles is not substantially increased.

Accordingly, the present invention provides a mount for connecting two articles together comprising a wall means extending around a space and having two sets of latches projecting from the wall means with one set provided for registration with each article and with the latches having latching surfaces facing laterally of the wall means, the latches being circumferentially offset from one another around the wall means and a latch of each set being circumferentially disposed between latches of the other set, the wall means also being resiliently flexible into and out of the space and the latches of the sets being relatively movable by resilient flexure of the wall means.

A mount according to the invention has a shape dictated by the use for which it is designed. The wall means is preferably endless, but may have end portions which approach each other around the space with ends which have a gap between them with the gap leading into the space. Also, dependent upon the configuration of the articles to be connected, in a side view, the wall means may for instance be planar or have a curvature. In addition, in a plan view onto the mount, i.e. that view showing the wall means encompassing the space, the wall means may follow a continuous curvature such that it is, for instance, circular or elliptical, or it may be formed as a series of linear walls or a combination of linear walls and walls having curvature.

Preferably, the sets of latches are relatively disposed so that flexure of the walls means to register each set of latches with its respective article acts in a direction to assist in holding the other set of latches to its respective article.

Also in a preferred arrangement, the mount is provided around the walls means with location pins for location within location holes in one or both of the articles. The locations pins act as pivots as the wall means are flexed during assembly of the articles thereby enhancing an opposite flexing effect from one side of each pin to the other around the wall means.

Mounts according to the invention having suitable design may be used to mount visual readout display units onto planar supports, e.g. printed circuit boards, in telephone bases.

Hence, according to another feature of the invention there is provided a combination of a visual readout display unit and a planar support for location within a telephone base and including a mount for connecting the display unit and planar support together, the mount comprising a planar wall means extending around a space and having two sets of latches projecting from the wall means with the latches having latching surfaces facing laterally of the wall means, the latches being circumferentially offset from one another around the wall means, and each latch in each set is circumferentially disposed between latches of the other set, the wall means also being resiliently flexible into and out of the space and latches of the sets being relatively movable by resilient flexure of the wall means to secure the display unit to the planar support with the sets of latches registering one set with the planar support and the other set with the display unit.

One embodiment of the invention will now be described, by way of example, with reference to the accompanying drawings, in which:

BRIEF DESCRIPTION OF THE DRAWINGS

FIG. 4 is an exploded isometric view of the combination taken in the same direction as FIG. 1;

FIG. 5 is a cross-sectional view through part of the assembly taken along line V—V in FIG. 1; and FIG. 6 is a cross-sectional view of part of the assembly taken along line VI—VI in FIG. 1.

DESCRIPTION OF THE PREFERRED EMBODIMENT

Figure 1:
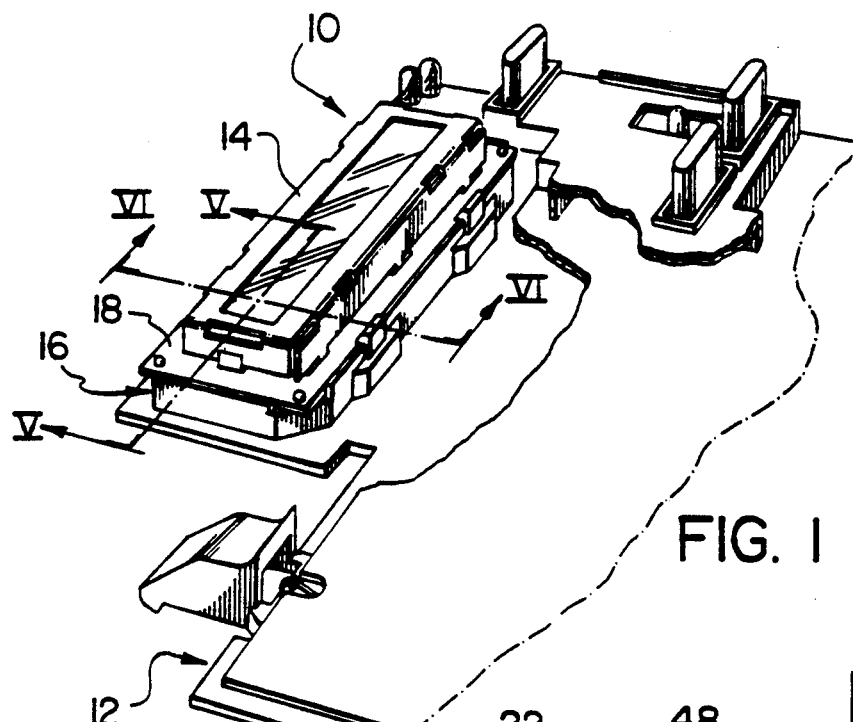
FIG. 1 is an isometric view of an assembly formed of a combination of a visual readout display unit, planar support and a mount.

As shown in FIG. 1, an assembly 10 comprises a printed circuit board 12 bearing electronic circuitry for location within a telephone base, a visual display unit 14, and a mount 16 which holds the board 12 and display unit 14 together. As may be seen from FIGS. 1 and 4, the display unit 14 is of conventional rectangular shape and is provided with a base flange 18 which extends outwardly all around its periphery.

To comply with the shape in plan view of the display unit 14, the mount 16 is of rectangular configuration (FIG. 2) having two long parallel opposed spaced walls 20 and two short walls 22. Depending from each of the short walls 22 is a latch 24 which is spaced intermeidate the ends of the associated wall 22, the walls together extending around an open space and spaced radially from an axis extending through the space. The latches 24 form one set of latches. Extending upwardly from the walls 20, i.e. in one axial direction, are four latches 26, two latches upon each wall 20 with the latches in each wall being spaced apart and also spaced from ends of the wall. The four latches 26, i.e. in the opposite axial direction, provide another set of latches. As may be seen, therefore, all the latches are spaced apart circumferentially around the walls means formed by the walls 20 and 22 and with the latches of the one set, i.e. the latches 24, being circumferentially disposed between the latches 26 and spaced from ends of the walls 22.

Figure 2:
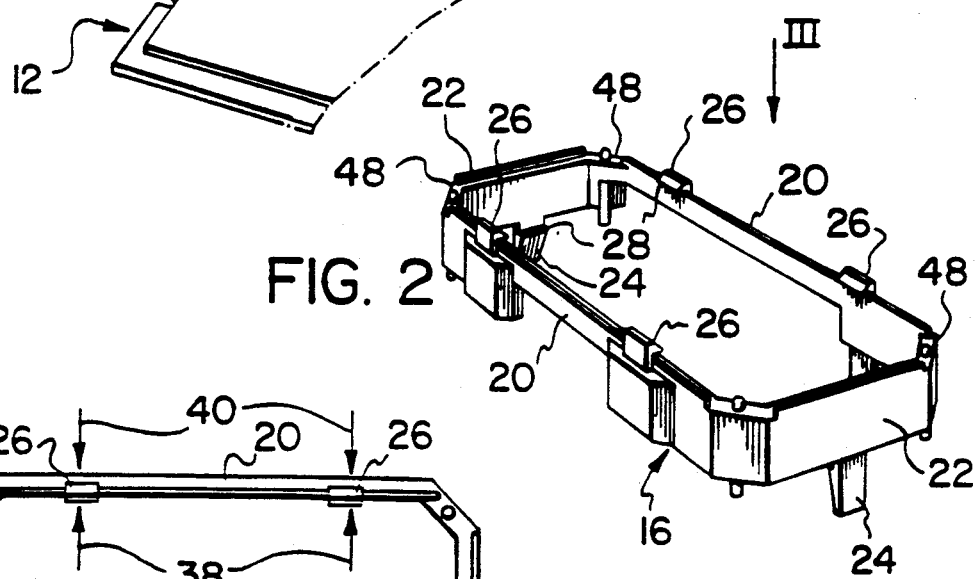
FIG. 2 is an isometric view of the mount taken from a side opposite to that shown in FIG. 1.

As may be seen from FIG. 2, all of the latches are directed inwardly for inward registration upon a surface to which the mount is to be attached and have latching surfaces 28 which face laterally of the walls 20 and 22.

The walls 20 and 22 are resiliently flexible between their ends so that they resiliently move into and out from the space encompassed by the walls. The latches 24 have inclined end surfaces 30 (FIG. 5) for engagement with the edges of slots 32 provided in the printed circuit board 12 for acceptance of the latches, thereby camming the latches outwardly of the mount as the latches are forced into the slots. This camming action causes the walls 22 to resiliently flex outwardly from the space encompassed by the walls as shown by arrows 34 in FIG. 3. In addition, the latches 26 have inclined walls 36 (FIG. 6) for engagement with the underside of the base flange 18 of the display unit 14 as the display unit is forced downwardly between the latches 26. Such movement to locate the display unit between the latches 26 as shown in FIG. 6 causes the walls 20 to resiliently flex outwards as shown by the arrows 38 in FIG. 3. The two sets of latches are relatively disposed therefore so that the resilient flexure of the walls 20 and 22 to register each set of latches with its respective article, i.e. the printed circuit board 12 and the display unit 14, acts in a direction to assist in holding the other set of latches to its respective article. In other words, resilient flexing of the walls 22 in the manner described to locate the latches 24 in the slots 32 is accompanied by a movement of the walls 20 into the space encompassed by the walls, i.e. in the direction of the arrows 40. Further, any outward flexing of the walls 20 in the direction of arrow 38 provides a resilient flexing inwards of the walls 22 in the opposite direction to the arrows 34. It also follows that resilient flexure required for movement of the latches into their positions of registration for holding the display unit and printed circuit board together is in the plane of the walls 20 and 22 i.e. along the lengths of the walls from their ends to the latches themselves. Hence this movement is provided in a lateral direction of the latches as distinct from a longitudinal direction of the latches so that the walls which provide this resilient flexing do not contribute to the length of the latches themselves. Thus each latch length is minimized as is the total height of the mount laterally of the walls.

The mount 16 is also provided with short discontinuous peripheral ribs 39 along walls 20 and 22 for alignment with edges of the base flange 18.

In addition, the mount 16 is provided at corner regions of the mount with a plurality, namely four, location pins 42 (FIG. 4) which extend downwardly and upwardly, i.e. laterally of the walls, for registration within location holes 44 in the printed circuit board 12 and location holes 46 in the base flange 18 of the display unit (FIG. 4). The location pins 42 are disposed substantially midway along short diagonal regions 48 (FIGS. 2 and 3) extending across the mount 16 between ends of the walls 20 and 22.

To assemble the components together in a most convenient fashion, the mount 16 is first located and registered upon the printed circuit board 12 by disposing the latches 24 through the slots 32. This is accompanied by resilient flexing of the walls 22 in the direction of arrows 34 as discussed above with resultant inward flexure of the walls 20 in the direction of arrows 40. With the mount upon the printed circuit board 12, as shown in FIG. 5, the walls 20 and 22 are engaged by lower edges 50 against an upper surface 52 of the printed circuit board. The display unit 14 is then assembled onto the mount 16 with a flat cable 54 leading from the display unit around an edge of the board 12 as shown in FIG. 6. As the display unit 14 is assembled onto the mount 16, the base flange 18 engages the inclined surfaces 36 of the latches 26 so as to force them apart accompanied by flexing movement of the sidewalls 20 outwardly in the direction of arrows 38. This applies an inward resilient force upon the sidewalls 22 to force the latches 24 more positively into registration with the printed circuit board 12. In the finished assembly, the abutment surfaces 28 of the latches 26 engage over the upper surface of the base flange 18 as shown in FIG. 6 and the underside of the base flange 18 engages the upwardly facing edge 56 of the walls 20 and 22. Thus in the assembly, the walls 20 and 22 are disposed between the display unit and the printed circuit board, but as the walls may be laterally extremely narrow, the height of the display unit and the board is not added to significantly. As a result, the assembly may easily be located within a telephone base having a desired degree of shallowness in its design.

Figure 3:
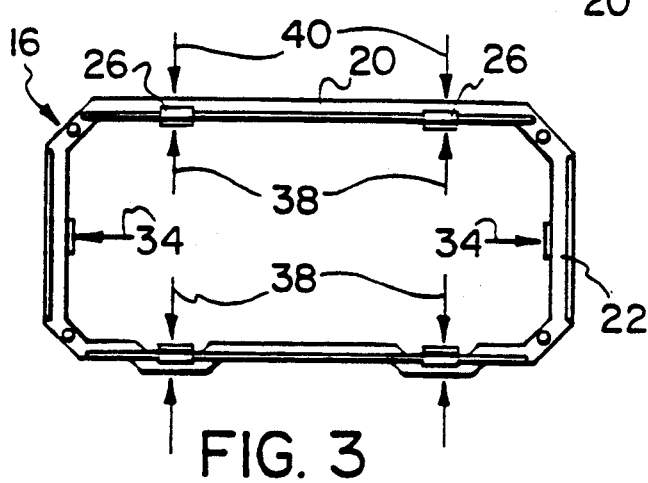
FIG. 3 is a plan view of the mount in the direction of arrow III in FIG. 2.

It should be noted that the diagonal regions 48 of the mount 16 and also the location pins 42 assist in the resilient flexing movement of the walls both to locate the mount in position and also to hold it there against any inadvertent flexing movement to disassemble the parts. Firstly, the pins 42 act as pivots within their holes 44 and 46 so that when the side walls 22 for instance are flexed outwards the whole of the walls means pivots about the four pins whereby the inward movement in the direction of arrows 40 of the walls 20 becomes enhanced. This action is also similar for the sidewalls 22 when the walls 20 are flexed outwardly in the direction of arrows 38 (FIG. 3). The diagonal regions 48 pivoting upon the pins 42 do not themselves flex to any substantial degree, but provide rigid bases about which the walls 20 and 22 themselves flex. As a result, bending of the walls 20 and 22 is controlled along a specific length of the walls between circumferentially spaced diagonal regions 48. Hence any uncontrollable sloppiness of movement in the walls is avoided.

As may be seen, the above mount 16 is particularly useful for holding a visual display unit 14 to a support such as a printed circuit board 12 in telephone base design without adding unduly to the total height of the assembly. Alternatively other designs of mounts may be used with similar results to hold other articles together in an assembly without increasing unduly their assembled height, these mounts also operating on the principles described above with regard to the mount 16.

What is claimed is:

1. A combination of a visual readout display unit and a planar support for location within a telephone base and including a mount for connecting the display unit and planar support together, the mount comprising:
   a wall extending around and spaced from an axis to define a space which is open axially of the wall;
   two sets of latches integrally formed with the wall, a first set of the latches extending axially in one direction from the wall and provided with latch abutment surfaces for latching registration with the planar support and a second set of the latches extending axially in the other direction from the wall and provided with latch abutment surfaces for latching registration with the display unit, and wherein all of said latch abutment surfaces face axially towards the wall, the latches are spaced apart around the wall, and to perform a latching operation the latches of each set are relatively movable towards or away from the axis by resilient flexure of parts of the wall.

2. A combination according to claim 1 wherein resilient flexure of parts of the wall to cause latching of the first set of latches with the planar support causes a resultant resilient flexure of other parts of the wall to assist in registering the second set of latches with the display unit.

3. A combination according to claim 2 provided with a plurality of location pins disposed in positions spaced apart around the wall between the positions of the latches, the location pins extending laterally from the wall and at least one of the display unit and planar support is formed with pin location holes whereby when the pins are disposed within the holes, the pins act as pivots during flexing of the wall.

4. A combination according to claim 3 wherein the wall is substantially quadrangular with two pairs of substantially parallel and opposing resilient wall portions, the wall having corner regions between adjacent wall portions and at each corner region a location pin is provided, each latch extending axially from a respective wall portion at a position spaced from corner regions.

* * * * *